3,787,370
PROCESS FOR THE PREPARATION OF SUBSTANTIALLY LINEAR POLYESTERS OF LOW FREE CARBOXYL GROUP CONTENT
Takeo Shima, Takanori Urasaki, and Isao Oka, Iwakuni, Japan, assignors to Teijin Limited, Osaka, Japan
No Drawing. Filed Mar. 14, 1972, Ser. No. 234,643
Int. Cl. C08g 17/015
U.S. Cl. 260—75 R           16 Claims

ABSTRACT OF THE DISCLOSURE

A process for the preparation of substantially linear, fiber-forming or film-forming polyesters from a dicarboxylic acid or its ester-forming derivative, or a hydroxycarboxylic acid or its ester-forming derivative, and a glycol or its ester-forming derivative, such process being characterized by addition of at least one specific orthocarbonate at a certain stage of the polycondensation reaction to thereby form polyesters having a low free carboxyl group content.

---

This invention relates to an improvement in a process for the preparation of polyesters by melt polymerization. More detailedly, the invention relates to a process for the preparation of substantially linear, fiber-forming or film-forming polyesters from a dicarboxylic acid or its ester-forming derivative, or a hydroxycarboxylic acid or its ester-forming derivative, and a glycol or its ester-forming derivative, such process being characterized by addition of at least one specific ortho-carbonate that will be detailed hereinbelow at a certain stage of the polycondensation reaction to thereby form polyesters having a low free carboxyl group content.

It has been well-known in the art that fiber-forming or film-forming polyesters are formed by the reaction between a dicarboxylic acid or its ester-forming derivative and a glycol (dihydric alcohol) or its ester-forming derivative.

As the dicarboxylic acid there may be mentioned aliphatic dicarboxylic acids having 2 to 20 carbon atoms, such as oxalic acid, succinic acid, adipic acid, sebacic acid, decane dicarboxylic acid and dodecane dicarboxylic acid, and aromatic acids such as terephthalic acid, isophthalic acid, diphenyl-4,4'-dicarboxylic acid, naphthalene-2,6-dicarboxylic acid, naphthalene - 2,7 - dicarboxylic acid, naphthalene-1,4-dicarboxylic acid, naphthalene-1,5-dicarboxylic acid, diphenylether-4,4'-dicarboxylic acid, diphenylsulfone-4,4'-dicarboxylic acid, diphenylmethane-4,4'-dicarboxylic acid and diphenoxyethane-4,4'-dicarboxylic acid.

As the ester-forming derivative of such dicarboxylic acid, there may be mentioned lower aliphatic esters such as methyl, ethyl, and n-propyl esters, aryl esters such as phenyl esters, and acid chlorides.

As the glycol, there may be exemplified aliphatic and alicyclic dihydric alcohols having hydroxyl groups bound to two adjacent carbon atoms, namely 1,2-glycols such as ethylene glycol, propylene glycol, butane-1,2-diol, cyclohexane-1,2-diol and cyclopentane-1,2-diol; aliphatic and alicyclic dihydric alcohols which have alcoholic hydroxyl groups in the 1- and 3-positions, namely 1,3-glycols such as trimethylene glycol, neopentylene glycol, butane-1,3-diol, and cyclohexane-1,3-diol; and other glycols such as tetramethylene glycol, hexamethylene glycol, decamethylene glycol, cyclohexane-1,4-dimethanol, and para-xyleneglycol. These glycols may be used singly, or mixtures of two or more of them can be used.

Among these glycols, 1,2-glycols may be used also in the form of reactive ester-forming derivatives such as carbonic acid esters and anhydrides.

Preparation of polyesters from the above-mentioned dicarboxylic acids or ester-forming derivatives thereof and the above-mentioned glycols or ester-forming derivatives thereof can be accomplished by a two-staged method comprising the first step of forming a diglycol ester of a dicarboxylic acid or a precondensate thereof by the direct esterification reaction between the dicarboxylic acid and glycol, the ester-exchange reaction between an ester-forming derivative of the dicarboxylic acid, such as a lower alkyl or phenyl ester of the dicarboxylic acid, and the glycol, or by the reaction between the dicarboxylic acid and an ester-forming derivative of the glycol such as an alkylene oxide; and the second step of forming a high polymer by heating the diglycol ester of the dicarboxylic acid or its precondensate at a reduced pressure and/or in an inert gas current to thus perform the polycondensation while expelling the glycol.

In the instant specification, the above-mentioned dicarboxylic acids and their ester-forming derivatives such as alkyl esters and phenyl esters are embraced by the term "dicarboxylic acid component."

A method of preparing polyesters comprising reacting a hydroxycarboxylic acid such as ω-hydroxycaproic acid, p-hydroxybenzoic acid, p-(β-hydroxyethoxy)benzoic acid, p-4-(β-hydroxyethoxy) - phenylbenzoic acid and β - hydroxyethoxyvanillic acid, or an ester-forming derivative of such hydroxycarboxylic acid such as a lower aliphatic or phenyl ester, with the above-mentioned glycol or its ester-forming derivative to form a glycol ester of the hydroxycarboxylic acid or a precondensate thereof (first step) and poly-condensing the same to form a substantially linear, fiber-forming or film-forming polyester (second step) has also been known.

The above-mentioned hydroxycarboxylic acids and their ester-forming derivatives are embraced by the term "hydroxycarboxylic acid component" in the instant specification.

The first-stage reaction of forming a glycol ester of the dicarboxylic or hydroxycarboxylic acid or a precondensate thereof may be allowed to advance in the absence of a catalyst between the dicarboxylic or hydroxycarboxylic acid component and the glycol or its ester-forming derivative, but the reaction can be conducted more smoothly in the presence of an esterification catalyst or an ester-exchange catalyst. Many catalysts have been known for such purpose. In this invention, any of such known catalysts can be used.

The glycol ester of the dicarboxylic or hydroxycarboxylic acid or its precondensate is subsequently polycondensed with removal of the glycol (second-stage reaction). In this second-stage reaction, the glycol ester of the dicarboxylic or hydroxycarboxylic acid or its precondensate is polycondensated. In each case, splitting-off of the glycol always accompanies this polycondensation reaction. Although the polycondensation reaction is allowed to advance in the absence of a catalyst, the reaction rate is extremely low in this case. Accordingly, the reaction rate is usually increased by employing such catalysts as antimony trioxide, antimony acetate, antimony trifluoride, antimony glycolate, tetrabutyl titanate, tetrapropyl titanate, potassium ethyl titanate ($K_2Ti(OC_2H_5)_6$), germanium dioxide, tetrabutyl germanate ($Ge(OC_4H_9)_4$), zinc acetate, lead oxide and manganese acetate. Even with use of such catalysts, however, it takes a considerably long time to complete this polycondensation reaction, and it is necessary to carry out the reaction at such high temperatures as 200 to 350° C. Therefore, occurrence of thermal decomposition cannot be avoided, which results in an increase in the amount of free carboxyl groups and in formaion of polyesters having a poor heat stability. For instance, when polyethylene terephthalate is prepared on a commercial scale, it is necessary to carry out the reaction at such high temperatures as 270 to 290° C. under such a high vacuum as 0.1 mm. Hg for 2 to 10 hours. In order to maintain the output at a certain level, it is necessary to provide large equipment. Further, since the reactants are exposed to high temperatures for a long time and thermal decomposition occurs with the advance of the polycondensation reaction, it is considerably difficult to reduce the content of the free carboxyl groups (terminal carboxyl groups) below a certain level and to obtain a polymer having a degree of polymerization exceeding a certain level.

With a view to developing a process for preparing polyesters having a low free carboxyl group content and a high degree of polymerization, extensive research was conducted and it was found that when an ortho-carbonate expressed by the following formula

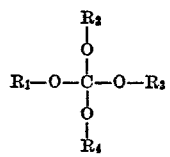

wherein $R_1$, $R_2$, $R_3$ and $R_4$, which may be the same or different, stand for a mono-valent aromatic group, is added to a polyester-forming reaction mixture after the intrinsic viscosity of the polyester reacts at least 0.2 and the polycondensation is further conducted under heating while splitting off the glycol component, a polyester having a low carboxyl group content can be easily obtained. Based on this finding, an improvement in the process for the preparation of polyesters characterized by addition of the ortho-carbonate expressed by the above formula was previously proposed (see U.S. Pat. 3,714,-125). Research has been furthered and it has now been found that with use of other ortho-carbonates polyesters having a sufficiently low free carboxyl group can be easily prepared. As a result the present invention was developed.

In accordance with this invention, a process is provided for the preparation of substantially linear, highly polymerized, fiber or film-forming polyesters by polycondensing a glycol ester of a dicarboxylic acid or a hydroxycarboxylic acid or a low condensate thereof while removing at least one glycol therefrom, such process being characterized by adding at least one orthocarbonate represented by the following Formula I, II or III;

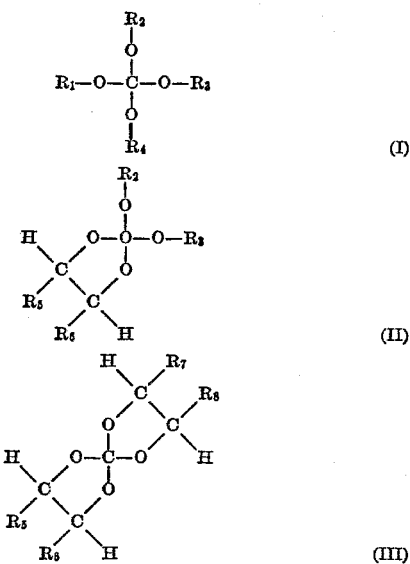

wherein $R_1$ represents a mono-valent aliphatic or alicyclic group which is inert to the ester-forming reaction and has a molecular weight not exceeding 150, $R_2$, $R_3$ and $R_4$, which may be the same or different, represent a monovalent aliphatic or alicyclic group which is inert to the ester-forming reaction and has a molecular weight not exceeding 150, or a mono-valent aromatic group which is inert to the ester-forming reaction and has a molecular weight not exceeding 250, and $R_5$, $R_6$, $R_7$ and $R_8$, which may be the same or different, represent a hydrogen atom, or a mono-valent aliphatic, alicyclic or aromatic group which is inert to the ester-forming reaction and has a molecular weight not exceeding 150, to a molten polyester having an intrinsic viscosity of at least 0.2, and further conducting the polycondensation under such conditions that the reaction mixture is maintained in the molten state at a subatmospheric pressure. In the instant specification, the value of the intrinsic viscosity is one calculated in ortho-chlorophenol at 35° C.

As the dicarboxylic component or hydroxycarboxylic acid component, any member selected from the above-mentioned compounds, may be used and any of glycols or ester-forming derivatives thereof recited hereinabove may be used as the glycol component.

Any conventional process known as the polyester preparation process may be adopted for forming a polyester from the dicarboxylic or hydroxycarboxylic acid component and the glycol or its ester-forming derivative in this invention. Not only can the above-mentioned known catalysts be used at the polycondensation reaction stage but at the stage of forming a glycol ester or its precondensate from the dicarboxylic or hydroxycarboxylic acid component and the glycol or its ester-forming derivative, but any known esterification or ester-exchange catalysts can be used. Further, in order to prevent decomposition of the reaction product during the polycondensation reaction, it is possible to add to the reaction mixture a stabilizer such as phosphorous acid, phosphoric acid and derivatives thereof, and/or a delustering agent such as titanium dioxide.

This invention also includes a process for preparing copolyesters by employing two or more dicarboxylic or hydroxycarboxylic components and/or two or more glycol components. Any of the known comonomers may be used, but it is preferred that the amount of the comonomer is less than 25 mole percent, especially less than 15 mole percent, based on the total components.

Still further, in order to copolymerize mono-functional compound such as benzoic acid, benzoyl benzoic acid and alkoxypolyalkylene glycols with the ends of the resulting polyesters, or to copolymerize a trifunctional or more highly functional compound such as glycerin, pentaerythritol, benzene tricarboxylic acid, hydroxyisonaphthalic acid and pyromellitic acid with the resulting polyester, it is possible to add such mono-functional or polyfunctional compounds in small quantities to the reaction mixture at the polycondensation stage.

In this invention, at the stage of polycondensation for forming a polyester, an ortho-carbonate expressed by above Formula I, II or III is added to the melt of the polycondensation reaction product (homopolyester or copolyester) when the intrinsic viscosity of the polycondensation product reaches at least 0.2, preferably at least 0.3, and the polycondensation reaction is further continued until a polyester of a desired intrinsic viscosity is obtained.

Any compound expressed by above Formula I, II or III can be used as the ortho-carbonate to be added. In the explanation of symbols $R_1$ to $R_8$ in Formulae I, II and III, the term "inert to the ester-forming reaction" means that the groups indicated by these symbols do not have any functional substituent capable of forming an ester under conditions of the polyester-forming reaction intended in this invention. More specifically, aliphatic, alicyclic and aromatic groups $R_1$ to $R_8$ constituting the ortho-carbonate should not possess an ester-forming functional substituent, such as a carboxyl group (—COOH), a carboxylic acid ester residue (—COOR in which R is a mono-valent hydrocarbon residue), a hydroxyl group (—OH) and an acyloxy group (—OCOR in which R is as defined above).

In this invention, it is important that in the compound (additive) expressed by the following Formula I

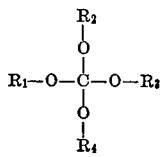

the mono-valent aliphatic or alicyclic group indicated as $R_1$ in above Formula I should have a molecular weight not exceeding 150, and it is preferred that the molecular weight of the group $R_1$ does not exceed 100. When the molecular weight of $R_1$ exceeds 100, especially 150, although the effect of reducing the free carboxylic group content in the resulting polyester is not completely diminished, the high molecular weight results in a disadvantage that the amount (weight) of the ortho-carbonate to be added must be increased, and because a monohydric alcohol formed by the reaction between the ortho-carbonate added and the polyester is not appreciably distilled from the polycondensation system, the remaining monohydric alcohol having a high molecular weight reduces the molecular weight of the resulting polyester and/or is linked with the polyester, with the consequence that heat resistance and solvent resistance of the resulting polyester are adversely influenced. In the instant specification the term "heat resistance" means the heat stability of the polyester in the molten state or the heat stability of a shaped article from the polyester, e.g. the dimension stability expressed by the heat shrinkage.

As such group $R_1$, aliphatic groups such as methyl, ethyl, n-propyl, isopropyl, n-butyl, isobutyl, tert-butyl, octyl, benzyl, β-phenylethyl and α-naphthylmethyl groups, and alicyclic groups such as cyclohexyl, cyclopentyl and methylcyclohexyl groups can be exemplified.

Each of $R_2$ to $R_8$ in the above Formula I and the following Formulae II and III

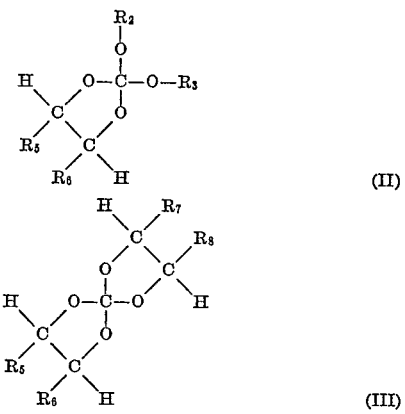

is inert to the ester-forming reaction. When these groups are aliphatic or alicyclic groups, they should possess a molecular weight not exceeding 150, preferably not exceeding 100. When $R_2$, $R_3$ and $R_4$ are aromatic groups, their molecular weight should not exceed 250 and it is preferred that their molecular weight is 200 or less. When $R_5$, $R_6$, $R_7$ and $R_8$ are aromatic groups, it is essential that they should have a molecular weight not exceeding 150 and it is preferred that their molecular weight is 100 or less.

As described with respect to the group $R_1$, if any of $R_2$, $R_3$ and $R_4$ in above Formulae I and II, has a molecular weight exceeding the above limit, although the effect of reducing the free carboxyl group content in the resulting polyester is not completely diminished, because of a high molecular weight of the ortho-carbonate to be added an economical disadvantage occurs in that the amount (weight) of the ortho-carbonate to be added should be increased. Further, a monohydric alcohol and/or a monohydric phenol resulting from the reaction between the ortho-carbonate and the polyester is difficult to remove from the polycondensation system by distillation, and sometimes undesired phenomena such as reduction of the molecular weight of the polyester and degradation of physical and chemical properties of the polyester are brought about by the presence of the alcohol and/or phenol linked with the ends of the resulting polyesters.

Further, $R_5$, $R_6$, $R_7$ and $R_8$ in above Formulae II and III are mono-valent aliphatic, alicyclic or aromatic groups and each of them should possess a molecular weight not exceeding 150, preferably not exceeding 100. When any of them has a molecular weight exceeding 100, especially exceeding 150, although the effect of reducing the free carboxyl group content in the resulting polyester is not completely diminished, because the molecular weight of the ortho-carbonate to be added is great, it must be added in a great amount (weight), which is an economical disadvantage. Further, the ortho-carbonate remains in the resulting polyester linked with the main chain of the polyester, and therefore, the degree of lowering the physical and chemical properties of the polyester becomes great. Accordingly, it is not desired that any of groups $R_5$ to $R_8$ have a molecular weight exceeding the above limit.

When groups $R_5$ to $R_8$ are aromatic groups, preferable examples are phenyl, p-nitrophenyl, p-chlorophenyl, m-chlorophenyl, m-bromophenyl, p-tolyl, 3,4-dimethylphenyl, p-ethylphenyl, p-isopropylphenyl, p-tert-butylphenyl, 2,3,4-triphenyl, α-naphthyl and β-naphthyl groups.

When groups $R_2$, $R_3$ and $R_4$ are aromatic groups, since they may have a higher molecular weight than groups $R_5$ to $R_8$, in addition to the above-recited aromatic groups, the following groups may be exemplified as preferable groups; namely, m-isoamylphenyl, p-hexylphenyl, 3-ethyl-4-isopropylphenyl, p-octylphenyl, p-benzylphenyl, p-phenylphenyl, 4-butyl-2-chlorophenyl, 4-isopropyl-3-nitrophenyl, p-cyclohexylphenyl, 4-methyl-1-naphthyl and 5-isopropylphenyl groups.

When groups $R_2$ to $R_8$ are aliphatic and alicyclic groups, the same groups as recited above with respect $R_1$ may be exemplified as preferable groups. These groups may be the same or different. Especially in the case of $R_5$ to $R_8$, although they may be the same or different, it is preferred that each of them is a hydrogen atom or a mono-valent aliphatic or alicyclic group having a molecular weight not exceeding 100.

When at least two, preferably three, of groups, $R_2$, $R_3$ and $R_4$ are aromatic groups in the ortho-carbonate of Formula I or when at least one, preferably two, of groups $R_3$ and $R_4$ are aromatic groups in the ortho-carbonate of Formula II, the addition of such ortho-carbonate gives a polyester having an extremely low free carboxyl group content and increases the rate of polycondensation. Accordingly, use of such ortho-carbonate is especially preferred.

In this invention, the additive expressed by above Formula I, II or III, namely the specific ortho-carbonate, is added to a molten polyester at the stage where the intrinsic viscosity of the polyester reaches at least 0.2, preferably at least 3, and the polycondensation reaction is further continued. During this polycondensation the ortho-carbonate additive is decomposed substantially completely to form a mono- or di-hydric alcohol and/or a monohydric phenol as well as carbon dioxide gas and carbonic acid esters. Substantial portions of such alcohol and phenol are distilled off from the polycondensation reaction mixture. Especially, phenols are distilled off more readily than alcohols.

It is considered, however, that there is a possibility that a part of the monohydric alcohol formed by decomposition of the ortho-carbonate remains in the polycondensation reaction mixture at least temporarily and it reacts with the polyester. Especially when a dihydric alcohol is formed by decomposition of the additive, it is considered that a greater part of the dihydric alcohol remains in the reaction mixture. Therefore, when an ortho-carbonate expressed by above Formula II or III is employed as the additive, it is prefrered that the additive is so selected that the dihydric alcohol of the following Formula (a) and/or (b)

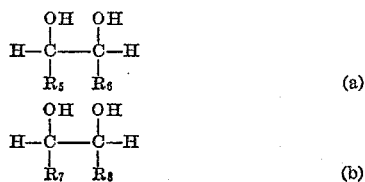

which is formed by decomposition of the additive will be the same as the glycol to be used for the preparation of the intended polyester. By such selection, it is possible to greatly reduce the free carboxyl group content in the resulting polyester without decline of the polycondensation reaction rate or degradation of properties of the resulting polyester. For instance, when the intended polyester is polyethylene terephthalate, it is preferred that an ortho-carbonate in which any of groups $R_5$ to $R_8$ is a hydrogen atom is used as the additive.

Preferable examples of the ortho-carbonate to be used in this invention are as follows:

Compounds expressed by Formula I methyl-triphenyl ortho-carbonate
ethyl-tri-p-tolyl ortho-carbonate
ethyl-diphenyl-p-chlorophenyl ortho-carbonate
n-propylphenyl-di-α-naphthyl ortho-carbonate
diethyl-diphenyl ortho-carbonate
diethyl-di-p-tolyl ortho-carbonate
dicyclohexyl-di-α-naphthyl ortho-carbonate
dimethyl-phenyl-p-chlorophenyl ortho-carbonate
methyl-ethyl-p-chlorophenyl-p-tolyl ortho-carbonate
tributyl-phenyl ortho-carbonate
tripropyl-β-naphthyl ortho-carbonate
ethyl-dipropyl-phenyl ortho-carbonate
tetramethyl ortho-carbonate
diethyl-dioctyl ortho-carbonate
methyl-butyl-dioctyl ortho-carbonate
methyl-ethyl-propyl-butyl ortho-carbonate Compounds expressed by Formula II diphenyl-ethylene ortho-carbonate
di-p-chlorophenyl-ethylene ortho-carbonate
di-β-naphthyl-ethylene ortho-carbonate
phenyl-ethyl-propylene ortho-carbonate
dipropyl-ethylene ortho-carbonate
dibutyl-1,2-dimethylethylene ortho-carbonate Compounds expressed by Formula III bis-ethylene ortho-carbonate
bis-propylene ortho-carbonate
bis-1,2-dimethylethylene ortho-carbonate
bis-1-propylenethylene ortho-carbonate
bis-1-propyl-2-methylethylene ortho-carbonate
bis-1-octylethylene ortho-carbonate
bis-1-cyclohexylethylene ortho-carbonate
bis-1-p-tolylethylene ortho-carbonate
1-methylethylene-ethylene ortho-carbonate
1-p-chlorophenyl-ethylene-ethylene ortho-carbonate
1-phenyl-2-methylethylene-1',2'-dimethylethylene ortho-carbonate Compounds of above Formulas I, II and III which are used as the additive in this invention are prepared by the following methods.

(1) Compounds of Formulas I and II

These compounds are prepared by reacting a diaryloxy-dichloro-methane formed by the reaction between a diaryl carbonate and phosphorus pentachloride (Chem. Ber., 94, 544 (1961)), with a suitable alcohol, glycol or phenol.

(2) Compounds of Formula I

These compounds are prepared by reacting trichloronitromethane with an alcohol (Org. Syn. Coll. vol. IV, 2nd edition).

(3) Compounds of Formula III

These compounds are prepared by reacting a product formed by the reaction between dibutyl tin oxide and a glycol, with carbon disulfide (J. Am. Chem. Soc., 55, 3851 (1933)).

(4) Compounds of Formulas (I) and (II)

These compounds are prepared by the ester-exchange reaction between a tetra-alkyl carbonate and an alcohol and/or a glycol.

In this invention, the ortho-carbonate to be used as an additive is added to a molten polyester at the stage where the intrinsic viscosity of the polyester reaches at least 0.2, preferably at least 0.3. When the addition of the ortho-carbonate is effected before the intrinsic viscosity of the molten polyester reaches 0.3, especially 0.2, the effect of reducing the free carboxyl group content in the final polyester is not very prominent irrespectively of the amount of the ortho-carbonate added, as compared with the case where the addition of the ortho-carbonate is not effected. In such case, if the amount of the ortho-carbonate added is large, the rate of the polycondensation reaction is lowered and it is impossible to obtain a polyester of a high degree of polymerization. For this reason, in this invention the ortho-carbonate is added to a molten polyester at the stage where the intrinsic viscosity of the polyester reaches at least 0.2, preferably at least 0.3.

The addition of the ortho-carbonate may be effected at any stage of the polycondensation reaction if the intrinsic viscosity of the polyester is 0.2 or higher. In other words, there is no upper limit on the intrinsic viscosity of the polyester to which the ortho-carbonate is added. Accordingly, in this invention it is possible to effectively reduce the free carboxyl group content of a commercially available polyester prepared by an optional conventional technique by remelting such commercially available polyester, adding the above-mentioned ortho-carbonate to the polyester melt and further conducting the polycondensation reaction to a desired extent while maintaining the polyester in the molten state at a subatmospheric pressure. In this case, the degree of polymerization of the polyester can be further increased, as is described below, by suitably adjusting the amount of ortho-carbonate added.

As mentioned above, in this invention the addition of the ortho-carbonate may be effected at any stage after the intrinsic viscosity of the polyester has reached at least 0.2, preferably 0.3. If this requirement is satisfied, the addition of the ortho-carbonate is effected at one time or the ortho-carbonate may be added incrementally at a desired frequency while the polycondensation reaction is continued.

The amount of the ortho-carbonate added is not particularly critical. Even if the ortho-carbonate is added in a small amount, an effect keeping with the amount added can be obtained, and the greater the amount added, the higher the effect of reducing the free carboxyl group content becomes. However, if the ortho-carbonate is added in too great an amount, reduction of the polycondensation reaction rate or lowering of the intrinsic viscosity of the polyester sometimes occurs.

Accordingly, in this invention it is preferred that when the ortho-carbonate is expressed by Formula I and at least two of $R_2$, $R_3$ and $R_4$ are aromatic groups, or when the ortho-carbonate is expressed by Formula II and at least one of $R_2$ and $R_3$ is an aromatic group, or when the ortho-carbonate is expressed by Formula III, the amount of the ortho-carbonate is N mole percent expressed by the following Formula IV, especially N' mole percent expressed by the following Formula V;

$$N \leq 2 \times [\eta]^{-1.3} \quad \text{(IV)}$$

$$N' \leq \tfrac{2}{3} \times [\eta]^{-1.3} \quad \text{(V)}$$

and that when the ortho-carbonate is expressed by Formula I and one of $R_2$, $R_3$ and $R_4$ is an aromatic group or all of them are aliphatic groups, or when the ortho-carbonate is expressed by Formula II and each of $R_2$ and $R_3$ is an aromatic group, the amount of the ortho-carbonate is M mole percent expressed by the following Formula VI, especially M' mole percent expresed by the following Formula VII;

$$M \leq \tfrac{2}{3} \times [\eta]^{-1.3} \quad \text{(VI)}$$

$$M' \leq \tfrac{1}{3} \times [\eta]^{-1.3} \quad \text{(VII)}$$

wherein $[\eta]$ designates the intrinsic viscosity of the polyester at the time when the ortho-carbonate is added, and N, N', M or M' stands for the mole percent of the ortho-carbonate to be added based on the total acid components constituting the polyesters.

When the amount of the ortho-carbonate added is too small, the effect of reducing the free carboxyl group content in the polyester is not sufficient. Therefore, it is preferable that the amount of the ortho-carbonate added meets the requirement expressed by the following Formula VIII, especially the following Formula IX;

$$0.05 \times [\eta]^{-1.3} \leq S \quad \text{(VIII)}$$

$$0.1 \times [\eta]^{-1.3} \leq S' \quad \text{(IX)}$$

wherein $[\eta]$ designates the intrinsic viscosity of the polyester at the time when the ortho-carbonate is added, and S or S' stands for the mole percent of the ortho-carbonate to be added based on the total acid components consisting of the polyester.

The upper limit N or M, especially N' or M' indicates the total amount of the ortho-carbonate to be added. When the addition of the ortho-carbonate is effected at one time, N or M indicates the amount of the ortho-carbonate to be added at one time. When the addition of the ortho-carbonate is effected in a divided increment, N or M indicates the total amount of the ortho-carbonate added. The objects of this invention can be attained conveniently if the amount of the ortho-carbonate added is within a range defined by the Formulae IV or VI and VIII, especially V or VII and IX.

Optimum amounts of the ortho-carbonate and optimum manners of addition of the ortho-carbonate can be readily determined by those skilled in the art by comparing the intrinsic viscosity of the polyester at the time of addition of the ortho-carbonate with the intrinsic viscosity of the polyester obtained when the polycondensation reaction has been conducted for a period after addition of the ortho-carbonate, and reviewing the results of the comparison in the light of requirements expressed by Formulae IV or VI and VIII, especially V or VII and IX.

In this invention, after the ortho-carbonate is added, the heating is further continued at a subatmospheric pressure while maintaining the reaction mixture in a molten state, until the free carboxyl group content is reduced to a desired level or a desired degree of polymerization is attained. It is preferred that such heating reaction is conducted under such conditions that products formed by decomposition of the added ortho-carbonate added, such as carbonic acid esters, alcohols, aromatic hydroxyl compounds and glycols are distilled off from the reaction mixture as rapidly as possible. More specifically, it is preferred that the heating reaction is carried out at a temperature that keeps the reaction mixture in the molten state at a subatmospheric pressure of less than 100 mm. Hg, especially less than 50 mm. Hg, and it is especially preferred that the heating reaction is carried out at such subatmospheric pressure at a temperature of from 250 to 300° C.

According to this invention, it is possible to obtain by a simple operation substantially linear aromatic polyesters having a low free carboxyl group content, such as generally less than 15 eq./$10^6$ g. (polyesters). When suitable conditions are selected, the free carboxyl group content can be reduced to less than 4 eq./$10^6$ g. (polyester). Further, as described above, in this invention it is possible to extremely increase the polycondensation reaction rate by selecting an ortho-carbonate of a suitable structure and adjusting the amount of the ortho-carbonate that is added.

Highly polymerized polyesters prepared according to this invention are excellent in heat resistance, especially heat resistance under wet or moist conditions, because of a very low content of the free carboxyl groups, and their other physical and chemical properties are comparable to those of polyesters prepared by conventional methods. Accordingly, highly polymerized polyesters obtained according to this invention, such as polyethylene terephthalate, are highly improved in heat resistance, especially heat resistance under wet or moist conditions, as compared with corresponding polyesters, such as polyethylene terephthalate, prepared by conventional methods without any degradation of the softening point or other physical properties.

The process of this invention will now be detailed by reference to examples. In the examples, the value of the intrinsic viscosity is as described hereinabove, one calculated from the value measured at 35° C. with respect to a solution of polyester in ortho-chlorophenol, and the content of the terminal carboxyl group is measured in accordance with the method of A. Conix (Macromol. Chem., 26, 226 (1958)).

EXAMPLES 1 TO 18 AND COMPARATIVE EXAMPLES 1 TO 2

These examples illustrate effects attained by addition of various ortho-carbonate additives.

An ester-exchange reaction vessel was charged with 97 g. of dimethyl terephthalate, 69 g. of ethylene glycol, 0.04 g. of antimony trioxide and 0.07 g. of calcium acetate monohydrate, and the ester-exchange reaction was carried out at 160–225° C. Methanol formed as a result of the ester-exchange reaction was distilled off.

After completion of the ester-exchange reaction, phosphorous acid was added to the reaction mixture in an amount equimolar to the calcium acetate. The reaction mixture was transferred into a polymerization vessel, and the inside temperature was raised to 265° C. over a period of about 30 minutes. In the subsequent 30 minutes the inside temperature was elevated to 275° C. and the inside pressure was reduced to a high vacuum of 0.1–0.3 mm. Hg, following which the polycondensation was further conducted for 55 minutes under this high vacuum of 0.1–0.3 mm. Hg to obtain a polyester having an intrinsic viscosity of 0.5. The inside pressure of the vessel was returned to atmospheric pressure by introduction of nitrogen, and an ortho-carbonate indicated in Table 1 was added to the reaction mixture in an amount of 0.5–1.0 mole percent based on the terephthalic acid component. The reaction was carried out for 3 minutes under atmospheric pressure, following which the pressure was reduced and the polycondensation reaction was further continued for 30–60 minutes under a high vacuum of 0.1–0.3 mm. Hg. The intrinsic viscosity $[\eta]$ and the free carboxyl group content (—COOH eq./$10^6$ g. polymer) of the resulting polyester are shown in Table 1.

For comparison, the above run was repeated by employing an ortho-carbonate in which $R_1$ to $R_4$ are groups having a relatively high molecular weight (Comparative Example 1) or by conducting the polycondensation reaction under a high vacuum of 0.1–0.3 mm. Hg for 85 minutes without addition of any ortho-carbonate (Comparative Example 2). Results of determination of the intrinsic viscosity and free carboxylic group content of the resulting polyester are also indicated in Table 1.

TABLE 1

| Example No. | Ortho-carbonate Kind | Amount added Grams | Mole percent | Poly str at time of addition of ortho-carbonate $[\eta]$ | $[\eta]^{-1.3}$ | Total time of high vacuum reaction (min.) | Resulting polyester $(\eta)$ | Free—COOH content (eq./10⁶ g. polyester) |
|---|---|---|---|---|---|---|---|---|
| Example 1 | $H_9C_4-O-C(C_4H_9)(O-C_4H_9)-O-C_4H_9$ | 0.76 | 0.5 | 0.492 | 2.51 | 115 | 0.653 | 5.3 |
| Example 2 | $H_{17}C_8-O-C(C_8H_{17})(O-C_8H_{17})-O-C_8H_{17}$ | 1.32 | 0.5 | 0.500 | 2.46 | 130 | 0.645 | 7.8 |
| Example 3 | $H_3C-C(CH_3)(O-C_6H_5)-O-C_6H_5$ | 0.65 | 0.5 | 0.485 | 2.57 | 85 | 0.655 | 3.2 |
| Example 4 | $O_2N-C_6H_4-O-C(C_4H_9)(O-C_6H_4-NO_2)-O-C_6H_4-NO_2$ | 2.50 | 1.0 | 0.49 | 2.52 | 70 | 0.751 | 5.0 |
| Example 5 | $H_{17}C_8-O-C(C_8H_{17})(O-C_6H_4-CH_3)-O-C_8H_{17}$ | 2.53 | 1.0 | 0.489 | 2.53 | 100 | 0.633 | 4.7 |
| Example 6 | Tri(2-naphthyloxy) methyl orthocarbonate (CH₃-C(O-naphthyl)₃) | 1.18 | 0.5 | 0.499 | 2.47 | 85 | 0.774 | 4.4 |
| Example 7 | $H_3C-C_6H_4-O-C(OCH_3)(OCH_3)-O-C_6H_4-CH_3$ | 1.43 | 1.0 | 0.489 | 2.53 | 85 | 0.900 | 2.5 |
| Example 8 | $C_4H_9O-C(OCH_3)(OCH_3)-OC_4H_9$ | 0.545 | 0.5 | 0.492 | 2.51 | 100 | 0.648 | 4.5 |

EXAMPLES 19 TO 22 AND COMPARATIVE EXAMPLE 3

These examples illustrate influences by the time of addition of the ortho-carbonate additive.

An ester-exchange reaction vessel was charged with 97 g. of dimethyl terephthalate, 69 g. of ethylene glycol, 0.04 g. of antimony trioxide and 0.07 g. of calcium acetate monohydrate, and the mixture was heated at 160–225° C. while methanol formed as a result of the ester-exchange reaction was distilled off.

After completing of the ester-exchange reaction, phosphorous acid was added to the reaction mixture in an amount equimolar to calcium acetate, and the reaction mixture was transferred into a polymerization vessel. The inside temperature of the vessel was raised to 265° C. over a period of about 30 minutes, and in the subsequent 30 minutes the inside temperature was elevated to 275° C. and the pressure was reduced to a high vacuum of 0.1–0.3 mm. Hg. The reaction under this high vacuum of 0.1–0.3 mm. Hg was carried out for a period indicated in Table 2, and the pressure was returned to atmospheric pressure by introduction of nitrogen. Then, 1.30 g. (1.0 mole percent based on the terephthalic acid component) of diphenyl-dimethyl ortho-carbonate was added to the reaction mixture and the reaction was carried out under atmospheric pressure for 3 minutes, following which the pressure was reduced and the polycondensation was furthered under a high vacuum of 0.1–0.3 mm. Hg. The intrinsic viscosity and free carboxyl group content of the resulting polyester are shown in Table 2.

nitrogen. Diphenyl-dimethyl ortho-carbonate was added to the reaction mixture in an amount indicated in Table 3, and the reaction was carried out under atmospheric pressure for 3 minutes, following which the pressure was reduced again and the polycondensation was furthered for 30 minutes under a high vacuum of 0.1–0.3 mm. Hg. The intrinsic viscosity and the terminal free carboxyl group content of the resulting polyester are shown in Table 3.

For comparison, the above run was repeated without employing any additive but by conducting the high vacuum polycondensation for 90 minutes (Comparative Example 4). Also the results of this comparative run are shown in Table 3.

TABLE 3

| Example No. | Ortho-carbonate, amount added | | Polyester at time of addition of ortho-carbonate | | Resulting polyester | |
|---|---|---|---|---|---|---|
| | Grams | Mole percent | $(\eta)$ | $(\eta)^{-1.3}$ | $(\eta)$ | Free —COOH content (eq./$10^6$/g. polyester) |
| Example 23 | 0.065 | 0.05 | 0.595 | 1.96 | 0.662 | 10.1 |
| Example 24 | 0.26 | 0.2 | 0.591 | 1.98 | 0.667 | 7.8 |
| Example 25 | 0.65 | 0.5 | 0.592 | 1.98 | 0.682 | 3.2 |
| Example 26 | 1.30 | 1.0 | 0.594 | 1.97 | 0.675 | 3.0 |
| Example 27 | 6.50 | 5.0 | 0.605 | 1.92 | 0.642 | 3.0 |
| Comparative Example 4 | | | | | 0.660 | 15.3 |

EXAMPLES 28 TO 30 AND COMPARATIVE EXAMPLE 5

These examples illustrate the preparation of polyethylene-2,6-naphthalate.

An ester-exchange reaction vessel was charged with 122 g. of dimethyl naphthalene-2,6-dicarboxylate, 69 g. of ethylene glycol, 0.02 g. of antimony trioxide and 0.07 g. of calcium acetate monohydrate, and the reactants were heated at 160–225° C. while methanol formed as a result of the ester-exchange reaction was distilled off.

After completion of the ester-exchange reaction, phosphorous acid was added to the reaction mixture in an amount equimolar to the calcium acetate. The reaction mixture was transferred into a polymerization vessel, and the inside temperature of the vessel was raised to 265° C. over a period of about 30 minutes. In the subsequent 30

TABLE 2

| Example No. | Polyester at time of addition of ortho-carbonate | | High vacuum reaction time (minutes) | | | Resulting polyester | |
|---|---|---|---|---|---|---|---|
| | $[\eta]$ | $[\eta]^{-1.3}$ | Before addition of ortho-carbonate | After addition of ortho-carbonate | Total | $[\eta]$ | Free —COOH content (eq./$10^6$ g. polyester) |
| Comparative Example 3 | 0.181 | 9.22 | 10 | 100 | 100 | 0.752 | 17.4 |
| Example 19 | 9.252 | 6.00 | 25 | 85 | 110 | 0.785 | 8.5 |
| Example 20 | 0.414 | 3.15 | 35 | 70 | 105 | 0.811 | 4.2 |
| Example 21 | 0.611 | 1.90 | 60 | 40 | 110 | 0.805 | 3.9 |
| Example 22 | 0.752 | 1.30 | 90 | 20 | 110 | 0.813 | 2.7 |

EXAMPLES 23 TO 27 AND COMPARATIVE EXAMPLE 4

These examples illustrate influences of the amount of the ortho-carbonate added.

An ester-exchange reaction vessel was charged with 97 g. of dimethyl terephthalate, 69 g. of ethylene glycol, 0.04 g. of antimony trioxide and 0.07 g. of calcium acetate monohydrate, and the reactants were heated at 160–225° C. while methanol formed as a result of the ester-exchange reaction was distilled off.

After completion of the ester-exchange reaction, phosphorous acid was added to the reaction mixture in an amount equimolar to the calcium acetate, and the reaction mixture was transferred into a polymerization vessel. The inside temperature of the vessel was raised to 265° C. over a period of about 30 minutes, and in the subsequent 30 minutes the inside temperature was elevated to 275° C. and the pressure was reduced to a high vacuum of 0.1–0.3 mm. Hg, following which the high vacuum reaction was conducted for 60 minutes to obtain a polyester having an intrinsic viscosity of about 0.6. At this point the pressure was returned to atmospheric pressure by introduction of minutes, the inside temperature was elevated to 285° C. and the inside pressure was reduced to a high vacuum of 0.1–0.3 mm. Hg, following which the polycondensation was carried out for 50 minutes under this high vacuum of 0.1–0.3 mm. Hg to obtain a polyester having an intrinsic viscosity of about 0.50. At this point the inside pressure was returned to atmospheric pressure by introduction of nitrogen, and an ortho-carbonate indicated in Table 4 was added to the reaction mixture in an amount of 1.0 mole percent based on the naphthalene-2,6-dicarboxylic acid component. The reaction was carried out under atmospheric pressure for 3 minutes, following which the pressure was reduced again and the polycondensation was conducted under a high vacuum of 0.1–0.3 mm. Hg for 30 minutes. The intrinsic viscosity ($\eta$) and the terminal free carboxyl group content (—COOH eq./$10^6$ g. polyester) of the resulting polyester as shown in Table 4.

For comparison, the high vacuum polycondensation was carried out under 0.1–0.3 mm. Hg for 55 minutes, and sampling was conducted. At this point, the sampled polyester had an intrinsic viscosity of 0.55 and a terminal free carboxyl group content of 14 eq./$10^6$ g. polyester. This TABLE 1—Continued

| Example No. | Ortho-carbonate Kind | Amount added Grams | Amount added Mole percent | Polyester at time of addition of ortho-carbonate [η] | Polyester at time of addition of ortho-carbonate [η]⁻¹·⁵ | Total time of high vacuum reaction (min.) | Resulting polyester (η) | Resulting polyester Free—COOH content (eq./10⁶ g. polyester) |
|---|---|---|---|---|---|---|---|---|
| Example 9 | C₈H₁₇O, OCH—CH₃, Cl-C₆H₄-O, OCH₂ (on central C) | 1.72 | 1.0 | 0.485 | 2.57 | 85 | 0.723 | 2.9 |
| Example 10 | (O₂N-C₆H₄-O)₂C(OCH₂-C₆H₄-CH₃)(OCH₂) | 1.09 | 0.5 | 0.512 | 2.39 | 85 | 0.800 | 5.0 |
| Example 11 | (C₆H₅-O)₂C(OCH₂)₂ | 1.35 | 1.0 | 0.510 | 2.40 | 100 | 0.650 | 3.3 |
| Example 12 | (CH₃-naphthyl-O)₂C(OCH₂)₂ | 1.93 | 1.0 | 0.500 | 2.46 | 85 | 0.735 | 4.2 |
| Example 13 | C(OCH₂)₄ (pentaerythritol ortho-carbonate) | 0.66 | 1.0 | 0.495 | 2.49 | 85 | 0.655 | 2.1 |
| Example 14 | (CH₃CH₂O)(CH₂O)₂C(OCH₂)(OCH₃) | 0.73 | 1.0 | 0.499 | 2.47 | 85 | 0.648 | 2.2 |
| Example 15 | bis[C₆H₅-CHO-CH₂O-C(OCH₂)(OCH₂)] dimeric ortho-carbonate | 1.07 | 1.0 | 0.485 | 2.57 | 85 | 0.662 | 2.5 |
| Example 16 | (CH₃-C₆H₄-CHO)(CH₂O)C(OCH-C₆H₄-CH₃)(OCH₂) | 0.78 | 0.5 | 0.487 | 2.55 | 85 | 0.653 | 2.9 |
| Example 17 | (CH₃CH—O)₂C(O—CHCH₃)₂ | 0.94 | 1.0 | 0.493 | 2.51 | 85 | 0.681 | 3.0 |
| Example 18 | (C₈H₁₇CH—O)(CH₂—O)C(O—CHC₈H₁₇)(O—CH₂) | 1.78 | 1.0 | 0.514 | 2.37 | 85 | 0.644 | 2.0 |
| Comparative Example 1 | C(O—C₁₈H₃₇)₄ | 2.72 | 0.5 | 0.489 | 2.53 | 180 | 0.625 | 14.0 |
| Comparative Example 2 | — | — | — | — | — | 85 | 0.650 | 13.5 | polyester was further subjected to the polycondensation reaction under high vacuum for 30 minutes. Results are also shown in Table 4.

A mixture of 87 g. of dimethyl adipate, 118 g. of hexamethylene glycol and 0.04 g. of tetrabutyl titanate was heated at 170–220° C. to effect the ester-exchange reac-

TABLE 4

| Example No. | Ortho-carbonate Kind | Amount added Grams | Amount added Mol percent | Polyester at time of addition of ortho-carbonate ($\eta$) | Polyester at time of addition of ortho-carbonate $(\eta)^{-1.3}$ | Resulting polyester ($\eta$) | Resulting polyester Free —COOH content (eq./10⁶ g. polyester) |
|---|---|---|---|---|---|---|---|
| Example 28 | (diethyl diphenyl ortho-carbonate) | 1.44 | 1.0 | 0.51 | 2.40 | 0.682 | 2.7 |
| Example 29 | (ditolyl dimethyl ortho-carbonate type) | 1.82 | 1.0 | 0.498 | 2.48 | 0.740 | 3.5 |
| Example 30 | (ditolyl dimethoxymethyl ortho-carbonate) | 1.43 | 1.0 | 0.51 | 2.40 | 0.676 | 4.0 |
| Comparative Example 5 | | | | | | 0.620 | 18.2 |

EXAMPLES 31 TO 33 AND COMPARATIVE EXAMPLE 6

These examples illustrate embodiments where tetramethylene glycol is used as the glycol component.

An ester-exchange reaction vessel was charged with 122 g. of methyl naphthalene-2,6-dicarboxylate, 100 g. of tetramethylene glycol and 0.04 g. of tetrabutyl titanate, and the reactants were heated at 170–230° C. to effect the ester-exchange reaction. After completion of the ester-exchange reaction, 0.036 g. of trimethyl phosphate was added to the reaction mixture, and it was transferred into a polymerization vessel. The inside temperature was raised to 260° C. over a period of about 30 minutes and the pressure was reduced to 30 mm. Hg. In the subsequent 30 minutes, the pressure was further reduced to a high vacuum of 0.1–0.2 mm. Hg, following which the polycondensation was furthered under a high vacuum of 0.1–0.2 mm. Hg for 25 minutes.

The intrinsic viscosity of the resulting polyester was about 0.4. At this point the pressure was returned to atmospheric pressure by introduction of nitrogen, and an ortho-carbonate indicated in Table 5 was added to the reaction mixture (the value of the mole percent being one based on the acid component of the polyester). Then, the reaction was carried out under atmospheric pressure for 5 minutes, and the pressure was reduced. Under a high vacuum of 0.1–0.2 mm. Hg the polycondensation was conducted for 20–50 minutes. The intrinsic viscosity [$\eta$] and the free carboxyl content (eq./10⁶ g. polyester) of the resulting polyester are shown in Table 5.

For comparison, the high vacuum polycondensation was carried out under 0.1–0.3 mm. Hg for 60 minutes without addition of any ortho-carbonate. (Comparative Example 6.) The results of this comparative run are also shown in Table 5.

EXAMPLE 34 AND COMPARATIVE EXAMPLE 7

These examples illustrate embodiments where aliphatic polyesters are prepared.

tion. Then, the temperature of a bath was maintained at 270° C. and the pressure was gradually reduced. Under 0.1 mm. Hg the polycondensation was conducted for 60 minutes to obtain a polyester having an intrinsic viscosity of 0.48 ([$\eta$]$^{-1.3}$=2.59). The pressure was returned to atmospheric pressure and 0.72 g. of diphenyl-diethyl ortho-carbonate was added to the reaction mixture. The pressure was reduced again and the polymerization was carried out for 30 minutes. The intrinsic viscosity and the free carboxyl group content of the resulting polyester are shown in Table 6.

For comparison, the polymerization was carried out similarly under 0.1 mm. Hg for 90 minutes without addition of diphenyl-diethyl ortho-carbonate (Comparative Example 7), results which are also shown in Table 6.

TABLE 6

| Example No. | Total time of high vacuum reaction (minutes) | Resulting polyester [$\eta$] | Resulting polyester Free —COOH content |
|---|---|---|---|
| Example 34 | 90 | 0.72 | 12.8 |
| Comparative Example 7 | 90 | 0.71 | 19.0 |

EXAMPLE 35 AND COMPARATIVE EXAMPLE 8

These examples illustrate the preparation of a polyester from a hydroxycarboxylic acid.

A mixture of 98 g. of methyl β-hydroxyethoxybenzoate, 34 g. of ethylene glycol and 0.02 g. of tetraisopropyl titanate was heated at 160–225° C. to effect the ester-exchange reaction. Methanol formed as a result of the ester-exchange reaction was distilled off. Then, the temperature of a bath was maintained at 285° C. and the pressure was gradually reduced. The polymerization was carried out under a reduced pressure of 0.2 mm. Hg for 600 minutes. The intrinsic viscosity of the resulting polyester was 0.420 ([$\eta$]$^{-1.3}$=3.08). At this point 0.72 g. of diphenyl-diethyl ortho-carbonate was added to the reac-

TABLE 5

| Example No. | Ortho-carbonate Kind | Amount added Grams | Amount added Mol percent | Polyester at time of addition of ortho-carbonate [$\eta$] | Polyester at time of addition of ortho-carbonate [$\eta$]$^{-1.3}$ | Total time of high vacuum reaction (min.) | Resulting polyester [$\eta$] | Resulting polyester Free —COOH content (eq./10⁶ g) polyester |
|---|---|---|---|---|---|---|---|---|
| Example 31 | Diethyl-dioctyl ortho-carbonate | 0.90 | 0.5 | 0.401 | 3.280 | 100 | 0.762 | 5.5 |
| Example 32 | Dibutyl-dinaphthyl ortho-carbonate | 1.11 | 0.5 | 0.395 | 3.34 | 60 | 0.775 | 3.2 |
| Example 33 | Bis-ethylene ortho-carbonate | 0.36 | 1.0 | 0.400 | 3.29 | 65 | 0.768 | 2.8 |
| Comparative Example 6 | | | | | | 60 | 0.755 | 15.5 | tion mixture, and the polymerization was further conducted under 0.2 mm. Hg for 60 minutes. The resulting polyester had an intrinsic viscosity of 0.462 and a free carboxyl group content of 2.1 eq./10⁶ g. polyester.

For comparison, the polymerization was carried out under 0.1 mm. Hg without employing any ortho-carbonate for 660 minutes. The resulting polyester had an intrinsic viscosity of 0.453 and a free carboxyl group content of 10.3 eq./10⁶ g. polyester.

EXAMPLES 36 TO 38 AND COMPARATIVE EXAMPLE 9

These examples illustrate preparation of copolyesters.

An ester-exchange reaction vessel was charged with 88.2 g. of dimethyl terephthalate, 8.8 g. (10 mole percent) of dimethyl isophthalate, 69 g. of ethylene glycol, 0.07 g. of magnesium acetate, 0.004 g. of cobalt acetate and 0.04 g. of antimony trioxide, and the reactants were heated at 170–230° C. to effect the ester-exchange reaction. After completion of the ester-exchange reaction, trimethyl phosphate was added to the reaction mixture in an amount equimolar to the sum of the magnesium acetate and cobalt acetate. Then, the reaction mixture was transferred into a polymerization vessel, and the inside temperature of the vessel was raised to 260° C. over a period of about 30 minutes and the pressure was reduced to 30 minutes. In the subsequent 30 minutes, the inside temperature was elevated to 285° C. and the pressure was reduced to a high vacuum of 0.1–0.2 mm. Hg, following which the polymerization was furthered for 40 minutes under 0.1–0.2 mm. Hg. The resulting polyester had an intrinsic viscosity of about 0.40. At this point the pressure was returned to atmospheric pressure by introduction of nitrogen, and an ortho-carbonate indicated in Table 7 was added to the reaction mixture in an amount of 1.0 mole percent based on the acid component of the polyester. The reaction was carried out for 5 minutes under atmospheric pressure, and the pressure was reduced again and the polymerization was conducted under 0.1–0.2 mm. Hg for 50 minutes. The intrinsic viscosity [$\eta$] and the terminal carboxyl group content (—COOH eq./10⁶ g. polyester) are shown in Table 7.

For comparison, the polymerization was conducted under 0.1–0.3 mm. Hg for 90 minutes without employing any ortho-carbonate (Comparative Example 9). Results of this comparative run are also shown in Table 7.

the reactants were reacted at 180° C. for 10 minutes in a nitrogen atmosphere. A valve disposed at the upper portion of the condenser was opened to effect the evaporation and to cool the reaction mixture to 130° C. Then, the reaction mixture was transferred into a pressure filter and unreacted terephthalic acid was removed by filtration.

At 130° C. the reaction mixture was separated into a molten phase insoluble in benzene and a benzene phase. The benzene phase was cooled to precipitate bis-$\beta$-hydroxyethyl terephthalate, the yield of which was 10.4 kg.

A polymerization vessel was charged with 19.65 kg. of bis-$\beta$-hydroxyethyl terephthalate prepared by the above method, 6.06 g. of antimony trioxide and 0.93 g. of trimethyl phosphate, and they were reacted under atmospheric pressure at 285° C. for 15 minutes in a nitrogen current, following which the pressure was reduced to 0.5 mm. Hg over a period of 45 minutes and the polymerization was carried out for 100 minutes under a reduced pressure of 0.5–0.2 mm. Hg. At this point, the polyester exhibited an intrinsic viscosity of 0.652 ([$\eta$]$^{-1.3}$=1.75). Then, 81 g. of solid methyltriphenyl orthocarbonate were added to the polyester under the above high vacuum and the polymerization was further continued for 60 minutes. The resulting polyester had an intrinsic viscosity of 0.89 and a terminal carboxyl group content of 4.3 eq./10⁶ g. polyester.

For comparison, the high vacuum polymerization was conducted for 160 minutes without addition of methyltriphenyl ortho-carbonate. The resulting polyester had an intrinsic viscosity of 0.782 and a terminal hydroxyl group of 27.8 eq./10⁶ g. polyester.

EXAMPLE 40 AND COMPARATIVE EXAMPLE 11

These examples illustrate the preparation of polyethylene terephthalate by the direct polymerization process.

An esterification vessel was charged with 83 g. of terephthalic acid, 69 g. of ethylene glycol, 0.04 g. of antimony trioxide and 0.07 g. of calcium acetate monohydrate, and they were reacted at 240° C. under pressure while water formed as a result of the reaction was distilled off.

After completion of the esterification reaction, phosphoric acid was added to the reaction mixture in an amount of 1.1 moles per mole of the calcium acetate, and the reaction mixture was transferred into a polym-

TABLE 7

| Example No. | Ortho-carbonate | Polyester at time of addition of ortho-carbonate | | Resulting polyester | |
|---|---|---|---|---|---|
| | | ($\eta$) | ($\eta$)$^{-1.3}$ | ($\eta$) | Free—COOH content (eq./10⁶ g. polyester) |
| Example 36 | 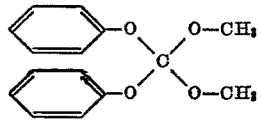 | 0.41 | 3.19 | 0.698 | 4.2 |
| Example 37 | 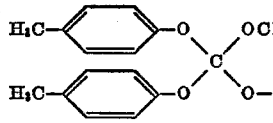 | 0.40 | 3.29 | 0.801 | 3.7 |
| Example 38 | 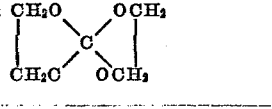 | 0.41 | 3.19 | 0.675 | 3.0 |
| Comparative Example 9 | | | | 0.662 | 17.3 |

EXAMPLE 39 AND COMPARATIVE EXAMPLE 10

These examples illustrate the preparation of polyethylene terephthalate by the ethylene oxide process.

An autoclave equipped with a condenser was charged with 8.3 kg. of terephthalic acid, 43 kg. of benzene, 4.4 kg. of ethylene oxide and 50 g. of triethyl amine, and erization vessel. Over a period of about 30 minutes, the inside temperature of the vessel was raised to 260° C. and the pressure was reduced to 30 mm. Hg. In the subsequent 30 minutes, the inside temperature was elevated to 285° C. and the pressure was reduced to a high vacuum of 0.1–0.2 mm. Hg, following which the polymerization was further conducted under 0.1–0.2 mm. Hg for 40 minutes to obtain a polyester having an intrinsic viscosity of 0.410 ($[\eta]^{-1.3}=3.19$). At this point the pressure was returned to atmospheric pressure by introduction of nitrogen, and dimethyl-diphenyl ortho-carbonate was added to the reaction mixture in an amount of 1.3 g. (1.0 mole percent based on the terephthalic acid component of the polyester). Then, the pressure was reduced again, and the polymerization was carried out under 0.1–0.2 mm. Hg for 50 minutes.

The resulting polyester had an intrinsic viscosity of 0.675 and a terminal carboxyl group content of 5.3 eq./$10^6$ g. polyester.

For comparison, the same procedures as above were repeated except that addition of the ortho-carbonate was not effected. The polymerization under high vacuum was conducted for 90 minutes. The resulting polyester had an intrinsic viscosity of 0.658 and a terminal carboxyl group content of 18.5 eq./$10^6$ g. polyester.

EXAMPLE 41 AND COMPARATIVE EXAMPLE 12

These examples illustrate the two-staged addition of the ortho-carbonate.

An esterification vessel was charged with 20 kg. of dimethyl terephthalate, 13.2 kg. of ethylene glycol, 7.4 g. of manganese acetate and 8.08 g. of antimony trioxide, and they were heated at 170–230° C. to effect the ester-exchange reaction. After completion of the ester-exchange reaction, trimethyl phosphate was added to the reaction mixture in an amount equimolar to the manganese acetate and the reaction mixture was transferred into a polymerization vessel. The inside temperature of the vessel was raised to 260° C. over a period of about 15 minutes, and in the subsequent 60 minutes, the inside temperature was elevated to 285° C. and the pressure was reduced to 0.1–0.2 mm. Hg, following which the polymerization was carried out for 90 minutes under 0.1–0.2 mm. Hg to obtain a polyester having an intrinsic viscosity of 0.531 ($[\eta]^{-1.3}=2.27$).

At this point, the pressure was returned to atmospheric pressure by introduction of nitrogen and 134 g. of methyl-triphenyl ortho-carbonate were added to the reaction mixture. The reaction was carried out for 5 minutes under reduced pressure and the pressure was reduced again, following which the polymerization was carried out for 20 minutes under 0.1–0.2 mm. Hg. The polyester exhibited an intrinsic viscosity of 0.705 ($[\eta]^{-1.3}=1.58$) at this point. Then, 134 g. of dimethyl-diphenyl ortho-carbonate were added to the reaction mixture in the same manner as above, and the polymerization was further conducted under a high vacuum of 0.1–0.2 mm. Hg for 50 minutes to obtain a polyester having an intrinsic viscosity of 0.985 and a terminal carboxyl group content of 5.4 eq./$10^6$ g. polyester.

The so obtained high polymer was spun by employing a melt-spinning apparatus. The resulting filamentary yarn had an intrinsic viscosity of 0.945 and a terminal carboxyl group content of 10.9 eq./$10^6$g. polyester. The yarn was stretched at a draw ratio of 4.9 at 90° C. and at draw ratio of 1.2 at 180° C., and then subjected to the post-heat-treatment.

The resulting yarn was twisted by a customary method and formed into a tire-reinforcing cord and the heat stability under the wet conditions was determined with respect to the so formed tire cord by the following method.

The sample was allowed to stand at a temperature of 25° C. and a relative humidity of 65% for 48 hours, and maintained at 150° C. for a subsequent 48 hours in the sealed state. The strength retention (%) was calculated by the following formula:

Strength retention (percent)

$$= \frac{\text{(strength (kg./2000 de) of tire cord after wet-heat resistance test)}}{\text{(strength (kg./2000 de) of tire cord before wet-heat resistance test)}} \times 100$$

Results are shown in Table 8.

For comparison, the high vacuum reaction was similarly conducted for 160 minutes without addition of the ortho-carbonate to obtained a polyester having an intrinsic viscosity of 0.80 and a terminal carboxyl group content of 25.8 eq./$10^6$ g. polyester, following which the polymerization was further continued for 200 minutes under reduced pressure. The resulting highly polymerized polyethylene terephthalate having an intrinsic viscosity of 0.970 and a terminal carboxyl group content of 32.0 eq./$10^6$ g. polyester was spun, stretched and formed into a tire cord in the same manner as above. The heat stability under the wet conditions was also tested with respect to the resulting tire cord in the same manner as above. Results are shown in Table 8.

TABLE 8

|  | Example 41 | Comparative Example 12 |
|---|---|---|
| Intrinsic viscosity [$\eta$] of tire cord | 0.945 | 0.930 |
| Terminal—COOH content of tire cord (eq./$10^6$ g. polyester) | 10.9 | 39.0 |
| Strength of tire cord before wet-heat resistance test (kg./2000 de) | 14.8 | 14.7 |
| Strength retention (percent) | 92 | 60 |

COMPARATIVE EXAMPLES 13 TO 18

In the same manner as in Example 1 to 18 and Comparative Example 1, polyethylene terephthalate, was prepared by employing an ortho-carbonate indicated in Table 9. Results are shown in Table 9.

The resulting polymer was extruded into cold water from the polymerization vessel to form chips, which were then heated at 160° C. for 4 hours by hot air and melt-spun at 290° C., followed by stretching and post-heat-treatment. Physical properties of the resulting polyester filaments are shown in Table 10.

For comparison, polymers obtained in Examples 1, 3, 8 and 13 were spun, stretched and post-heat-treated in the same manner as above. Physical properties of the resulting polyester filaments are shown in Table 10.

TABLE 9

| Example No. | Ortho-carbonate Kind | Amount added Grams | Mol percent | Polyester at time of addition of ortho-carbonate [$\eta$] | [$\eta$]$^{-1.3}$ | Total time of high vacuum reaction (min.) | Resulting polyester [$\eta$] | Free —COOH content (eq./$10^6$ g. polyester) |
|---|---|---|---|---|---|---|---|---|
| Comparative Example 13. | H₃CO—C(OCH₃)(O—C₆H₄—C₆H₄—C₆H₁₃)(O—C₆H₄—C₆H₄—C₆H₁₃) | 1.45 | 0.5 | 0.489 | 2.53 | 160 | 0.642 | 12.5 |
| Comparative Example 14. | H₃CO, H₃CO\C/O—CH(C₈H₁₇)/O—CH—C₆H₁₃ | 2.03 | 1.0 | 0.485 | 2.57 | 100 | 0.650 | 4.8 |

TABLE 9—Continued

| Example No. | Ortho-carbonate Kind | Amount added Grams | Mol percent | Polyester at time of addition of ortho-carbonate [η] | [η]⁻¹·³ | Total time of high vacuum reaction (min.) | Resulting polyester [η] | Free —COOH content (eq. 10⁶ g. polyester) |
|---|---|---|---|---|---|---|---|---|
| Comparative Example 15. | H₃₁C₁₅O\ /O—CH₃ \C/ H₃₁C₁₅O/ \O—CH₃ | 1.31 | 0.5 | 0.499 | 2.47 | 180 | 0.635 | 13.6 |
| Comparative Example 16. | (see structure) | 1.58 | 0.5 | 0.495 | 2.49 | 140 | 0.638 | 12.1 |
| Comparative Example 17. | H₁₃C₆—CH—O\ /O—CH—C₁₂H₂₅ \C/ H₂₅C₁₂—CH—O/ \O—CH—C₆H₁₃ | 3.18 | 1.0 | 0.493 | 2.51 | 160 | 0.650 | 5.2 |
| Comparative Example 18. | H₃₁C₁₅—O\ /O—CH₃ \C/ H₃₁C₁₅—O/ \O—C₁₅H₃₁ | 1.81 | 0.5 | 0.495 | 2.49 | 160 | 0.632 | 13.0 |

TABLE 10

| Example No. | [η] | Strength (g./d.) | Percent Elongation | Heat shrinkage at 180° C. |
|---|---|---|---|---|
| Comparative Example 13. | 0.610 | 5.5 | 19 | 14.2 |
| Comparative Example 14. | 0.620 | 5.6 | 20 | 15.0 |
| Comparative Example 15. | 0.600 | 5.4 | 19 | 14.0 |
| Comparative Example 16. | 0.605 | 5.4 | 20 | 14.2 |
| Comparative Example 17. | 0.620 | 5.5 | 20 | 15.2 |
| Comparative Example 18. | 0.596 | 5.4 | 18 | 14.1 |
| Example 1 | 0.625 | 5.6 | 20 | 13.0 |
| Example 3 | 0.628 | 5.6 | 21 | 13.2 |
| Example 8 | 0.622 | 5.6 | 20 | 13.0 |
| Example 13 | 0.628 | 5.6 | 19 | 12.9 |

Polymers obtained in comparative examples were defective in that the reduction of the intrinsic viscosity during the spinning step was extreme or the heat shrinkage of the resulting filaments was high.

What we claim is:

1. A process for the preparation of substantially linear, highly polymerized carboxylic acid esters by polycondensing a glycol ester of a dicarboxylic acid or a hydroxycarboxylic acid or a low condensate thereof while removing at least one glycol therefrom, said process being characterized by adding at least one ortho-carbonate expressed by the following Formula I, II or III;

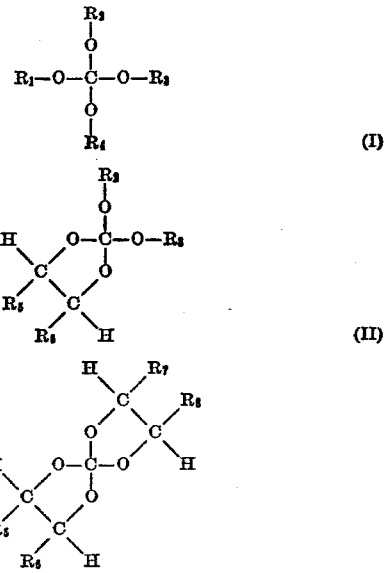

(I)

(II)

wherein $R_1$ represents a mono-valent aliphatic or alicyclic group which is inert to the ester-forming reaction and has a molecular weight not exceeding 150, $R_2$, $R_3$ and $R_4$, which may be the same or different, represent a mono-valent aliphatic or alicyclic group which is inert to the ester-forming reaction and has a molecular weight not exceeding 150, or a mono-valent aromatic group which is inert to the ester-forming reaction and has a molecular weight not exceeding 250, and $R_5$, $R_6$, $R_7$ and $R_8$, which may be the same or different, represent a hydrogen atom, or a mono-valent aliphatic, alicyclic or aromatic group which is inert to the ester-forming reaction and has a molecular weight not exceeding 150, to a molten polyester having an intrinsic viscosity of at least 0.2 as calculated from the value measured in ortho-chlorophenol solvent at 35° C., and further conducting the polycondensation under such conditions that the reaction mixture is maintained in the molten state at a subatmospheric pressure.

2. The process of claim 1, wherein the glycol is a 1,2-glycol.

3. The process of claim 1, wherein the dicarboxylic acid is selected from terephthalic acid and naphthalene-2,6-dicarboxylic acid.

4. The process of claim 1, wherein the ortho-carbonate is selected from members expressed by the formula:

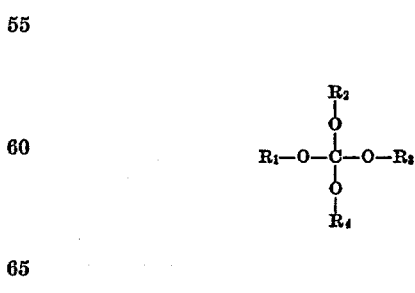

wherein each of $R_1$, $R_2$, $R_3$ and $R_4$ is inert to the ester-forming reaction, $R_1$ is a mono-valent aliphatic or alicyclic group having a molecular weight not exceeding 100, $R_2$ and $R_3$, which may be the same or different, represent a mono-valent aromatic group having a molecular weight not exceeding 250, and $R_4$ is a mono-valent aliphatic or alicyclic group having a molecular weight not exceeding 100 or a mono-valent aromatic group having a molecular weight not exceeding 250.

5. The process of claim 1, wherein the ortho-carbonate is selected from members expressed by the formula:

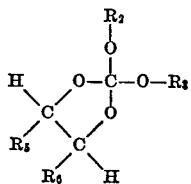

wherein each of $R_2$, $R_3$, $R_5$ and $R_6$ is inert to the ester-forming reaction, $R_2$ is a mono-valent aliphatic or alicyclic group having a molecular weight not exceeding 100 or a mono-valent aromatic group having a molecular weight not exceeding 250, $R_3$ is a mono-valent aromatic group having a molecular weight not exceeding 250, and $R_5$ and $R_6$, which may be the same or different, represent a hydrogen atom or a mono-valent aliphatic or alicyclic group having a molecular weight not exceeding 100.

6. The process of claim 1, wherein the ortho-carbonate is selected from members expressed by the formula:

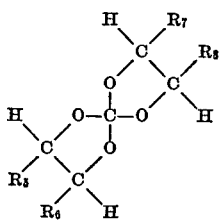

wherein $R_5$, $R_6$, $R_7$ and $R_8$, which may be the same or different, are inert to the ester-forming reaction and represent a hydrogen atom, or a mono-valent aliphatic or alicyclic group having a molecular weight not exceeding 100.

7. The process of claim 1, wherein the ortho-carbonate is added to a molten polyester having an intrinsic viscosity of at least 0.3 as calculated from the value measured in ortho-chlorophenol solvent at 35° C.

8. The process of claim 1, wherein the amount of the ortho-carbonate to be added is N mole percent expressed by the following formula:

$$0.05 \times [\eta]^{-1.3} \leq N \leq 2 \times [\eta]^{-1.3}$$

wherein ($\eta$) designates the intrinsic viscosity of the polyester at the time when the ortho-carbonate is added, and N represents the mole percent of the ortho-carbonate to be added based on the total acid components constituting the polyester.

9. The process of claim 8, wherein the amount of the ortho-carbonate to be added is N' mole percent expressed by the following formula:

$$0.1 \times [\eta]^{-1.3} \leq N' \leq \tfrac{2}{3} \times [\eta]^{-1.3}$$

wherein [$\eta$] designates the intrinsic viscosity of the polyester at the time when the ortho-carbonate is added, and N' represents the mole percent of the ortho-carbonate to be added based on the total acid components constituting the polyester.

10. The process of claim 1, wherein during the step of the condensation polymerization of at least one acid component selected from the group consisting of aromatic dibasic acids, their functional derivatives, aromatic hydroxycarboxylic acids and their functional derivatives, with at least one 1,2-glycol, at least one ortho-carbonate of the formula:

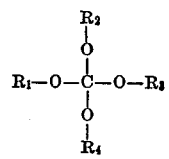

wherein each of $R_1$, $R_2$, $R_3$ and $R_4$ is inert to the ester-forming reaction, $R_1$ is a mono-valent aliphatic or alicyclic group having a molecular weight not exceeding 100, $R_2$ and $R_3$, which may be the same or different, represent a mono-valent aromatic group having a molecular weight not exceeding 250, and $R_4$ is a mono-valent aromatic group having a molecular weight not exceeding 250, is added to the reaction product when the reaction product has an intrinsic viscosity, as calculated from the value measured in ortho-chlorophenol solvent at 35° C., of at least 0.2.

11. The process of claim 1, wherein during the step of the condensation polymerization of at least one acid component selected from the group consisting of aromatic dibasic acids, their functional derivatives, aromatic hydroxycarboxylic acids and their functional derivatives, with at least one 1,2-glycol, at least one ortho-carbonate of the formula:

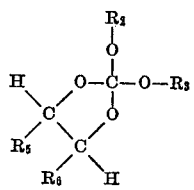

wherein each of $R_2$, $R_3$, $R_5$ and $R_6$ is inert to the ester-forming reaction, $R_2$ is a mono-valent aliphatic or alicyclic group having a molecular weight not exceeding 100 or a mono-valent aromatic group having a molecular weight not exceeding 250, $R_3$ is a monovalent aromatic group having a molecular weight not exceeding 250, and $R_5$ and $R_6$, which may be the same or different, represent a hydrogen atom or a mono-valent aliphatic or alicyclic group having a molecular weight not exceeding 100, is added to the reaction product when the reaction product has an intrinsic viscosity, as calculated from the value measured in ortho-chlorophenol solvent at 35° C., of at least 0.2.

12. The process of claim 1, wherein during the step of the condensation polymerization of at least one acid component selected from the group consisting of aromatic dibasic acids, their functional derivatives, aromatic hydroxycarboxylic acids and their functional derivatives, with at least one 1,2-glycol, at least one ortho-carbonate of the formula:

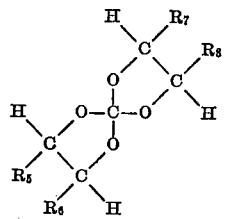

wherein $R_5$, $R_6$, $R_7$ and $R_8$, which may be the same or different, are inert to the ester-forming reaction and represent a hydrogen atom or a mono-valent aliphatic or alicyclic group having a molecular weight not exceeding 100, is added to the reaction product when the reaction product has an intrinsic viscosity, as calculated from the value measured in ortho-chlorophenol solvent at 35° C., of at least 0.2.

13. The process of claim 2, wherein said 1,2-glycol is ethylene glycol.

14. The process of claim 10, wherein said ortho-carbonate is added to the reaction system when the reaction product has an intrinsic viscosity of at least 0.3.

15. The process of claim 11, wherein said ortho-carbonate is added to the reaction system when the reaction product has an intrinsic viscosity of at least 0.3.

16. The process of claim 12, wherein said ortho-carbonate is added to the reaction system when the reaction product has an intrinsic viscosity of at least 0.3.

References Cited

UNITED STATES PATENTS

| | | |
|---|---|---|
| 3,433,770 | 3/1969 | Shima et al. |
| 3,444,141 | 5/1969 | Shima et al. |
| 3,714,125 | 1/1973 | Shima et al. |

MELVIN GOLDSTEIN, Primary Examiner

U.S. Cl. X.R.

260—75 M